(12) United States Patent
Boyce

(10) Patent No.: US 6,228,312 B1
(45) Date of Patent: May 8, 2001

(54) THERMOPLASTIC COMPOSITE PRODUCTS AND METHOD OF LINING PIPEWORK

(75) Inventor: Gerard Stephen Boyce, Nottinghamshire (GB)

(73) Assignees: Severn Trent Water Limited, Birmingham; Anglian Water Services Limited, Cambridge; Yorkshire Water Services Limited, Leeds; Euro-Projects (LTTC) Limited, Leicestershire, all of (GB)

(*) Notice: Subject to any disclaimer, the term of this patent is extended or adjusted under 35 U.S.C. 154(b) by 0 days.

(21) Appl. No.: 09/319,059
(22) PCT Filed: Dec. 16, 1997
(86) PCT No.: PCT/GB97/03453
§ 371 Date: May 27, 1999
§ 102(e) Date: May 27, 1999
(87) PCT Pub. No.: WO98/26919
PCT Pub. Date: Jun. 25, 1998

(30) Foreign Application Priority Data

Dec. 16, 1997 (GB) ................................. 9626060

(51) Int. Cl.[7] ................................. B29C 63/34
(52) U.S. Cl. .............. 264/458; 264/493; 264/36.16; 264/36.17; 264/516; 264/269; 156/287; 156/294
(58) Field of Search ................... 264/458, 269, 264/36.16, 36.17, 516, 492, 493; 156/287, 294; 138/97, 98, DIG. 2

(56) References Cited

U.S. PATENT DOCUMENTS

| | | | |
|---|---|---|---|
| 4,282,905 | * 8/1981 | Dopkin et al. | .......... 138/DIG. 2 |
| 5,077,107 | * 12/1991 | Kaneda et al. | .......... 138/98 |
| 5,205,886 | 4/1993 | White . | |
| 5,213,727 | * 5/1993 | Gargiulo | .......... 156/287 |
| 5,580,642 | * 12/1996 | Okamoto et al. . | |
| 5,863,644 | * 1/1999 | Bonigk et al. . | |

FOREIGN PATENT DOCUMENTS

| | | |
|---|---|---|
| 4 212 448 | 10/1993 | (DE) . |
| 0 033 244 | 8/1981 | (EP) . |
| 0 417 827 | 3/1991 | (EP) . |
| 0 630 736 | 12/1994 | (EP) . |
| 0 664 202 | 7/1995 | (EP) . |
| 2 628 507 | 9/1989 | (FR) . |
| 2 156 240 | 10/1985 | (GB) . |
| WO 92/12847 | 8/1992 | (WO) . |
| WO 96/18493 | 6/1996 | (WO) . |

* cited by examiner

Primary Examiner—Mathieu D. Vargot
(74) Attorney, Agent, or Firm—Schweitzer Cornman Gross & Bondell LLP

(57) ABSTRACT

A pipe (4) is rehabilitated by means of a tubular liner (5) which is introduced into the pipe in a contracted form, expanded into contact with the pipe wall, and hardened to retain its form. The liner (5) comprises composite material formed by knitting, braiding or weaving tows of intermingled filaments of thermoplastic and reinforcing fiber, the liner being heated during application to the pipe in order to melt the thermoplastic. The composite material may be created as a sleeve. Alternatively, a sheet of the material may be calendered and rolled up into a tubular form, overlapping edge margins of the sheet being bonded together after expansion of the tube into contact with the pipe wall.

28 Claims, 3 Drawing Sheets

THERMOPLASTIC COMPOSITE PRODUCTS AND METHOD OF LINING PIPEWORK

This invention relates to the manufacture and use of products fabricated from fibre reinforced thermoplastics composite materials. In particular the invention relates to methods of lining pipework and other ducts with such materials, and to the fabrication of duct liners and pipes from such materials.

Within the term "duct", where it is used herein, is included pipes, tubes and conduits, whether for conveying fluids (e.g. a sewer) or for other purposes.

A variety of different techniques are currently in use for rehabilitating existing pipe systems by lining the existing pipework rather than removing and replacing it. Lining existing pipework is generally cheaper, and causes less disruption, than complete replacement programs and is thus widely used in the water and gas supply industries.

For instance, the majority of water mains in the UK are cast iron (most having a diameter of 150 mm or less). Failure of such pipework due to corrosion (both internal and external) is becoming an increasing problem as existing systems age. It is, for example, estimated that over 50% of all water mains in the UK have been in service for more than forty years and that 20% have been in service for more than eighty years. There is therefore an increasing demand for the development of effective rehabilitation techniques.

Conventional methods for lining pipework include cement and epoxy resin spray coating processes, and "slip lining" processes. The latter involves inserting a pipe liner, typically fabricated from polyethylene or PVC, into the existing pipework.

Slip lining is carried out in a variety of ways using a variety of different forms of pipe liner. For instance, one type of slip lining widely used in the gas industry, referred to as "swage lining", involves winching an MDPE pipe liner into an in situ pipe having first pulled the liner through a die to reduce its diameter. Once in position the liner will expand and attempt to revert to its original diameter. Thus, after a period of twelve hours or so the liner will expand into a close fit within the host pipe.

An advantage of swage lining, and indeed other slip lining process, is that the liner can provide structural strength to the host pipe to meet requirements of high supply pressures. However, where such structural liners are used, steps must be taken to reduce the diameter of the liner so that it can be drawn into the pipe if a close fit between the liner and the pipe wall is to be obtained. Winch loads used can be very high which can provide an installation hazard. Furthermore, even with "close fit" slip lining techniques, such as swage lining, the liner may not properly revert to a close fit within the host pipe along its entire length if there are variations in the diameter of the pipe. This can result in gaps being left between the liner and the pipe wall which is undesirable. For instance, if the liner fails, fluid may run between the liner and the pipe wall before escaping and thus the externally observable manifestation of a leak or burst in the lining could be a considerable distance from the actual point of failure, making it difficult to identify the location of the failure.

It is an object of the present invention to provide a new method for lining pipework or other form of duct.

According to a first aspect of the present invention there is provided a method of lining a duct comprising:

inserting into the duct a liner comprising composite material comprising filaments of thermoplastic and filaments of reinforcing fibre;

heating the liner to melt the thermoplastic filaments;

applying pressure to the heated liner to press it into contact with the duct; and enabling or permitting the liner to cool whilst in contact with the duct in order to harden the thermoplastic/reinforcing fibre composite.

A suitable composite material is available from Vetrotex International of 767 quai des Allobroges—BP 929, 73009 Chambery Cedex, France (a subsidiary to St. Gobain) under the registered trade name TWINTEX. TWINTEX is, for instance, available as wound rovings, or woven fabrics, or tows comprising homogeneously intermingled long filaments of thermoplastics such as polypropylene, polyethylene, polyethyleneterephthlate (PET) and polybutylterephthlate (PBT) with E-glass, the glass fibre content typically being 45 to 75 WT % (20 to 50 vol %). The TWINTEX manufacturing process enables the thermoplastic and glass fibre filaments to be mixed "dry" with a high degree of control over the distribution of the two filamentary fibres.

Consolidation of the TWINTEX "prepreg" material into a rigid composite is achieved by heating the material under pressure to melt the thermoplastic and disperse it amongst the glass fibres. Cooling the material then solidifies the thermoplastic which forms a solid matrix around the reinforcing glass fibres.

The homogeneous distribution of the filaments in the TWINTEX product ensures favourable processing conditions of temperature verses pressure and the resultant consolidated composite material has good mechanical properties. Further details of the TWINTEX product are readily available from the manufacturer.

Before consolidation, the composite material is relatively flexible and thus may be inserted into a duct to be lined whilst in a collapsed configuration and subsequently expanded to contact the duct wall.

During the installation process, pressure may be applied to the liner material to consolidate the composite during the heating stage and/or in between the heating stage and the cooling stage and/or during the cooling stage.

A variety of different methods may be used to heat the liner, including irradiating the liner with infrared radiation, or heating the liner using hot gas or steam.

It is preferred that in the duct lining method according to the present invention a liner comprising glass reinforcing fibres is used (e.g. TWINTEX), and infrared radiation is used to heat the liner. It has been found that glass fibres are particularly responsive/absorbent to shortwave infrared radiation (i.e. wavelength less than 2 $\mu$m) in particular frequency ranges. The glass fibres thus heat up relatively quickly and melt the thermoplastic filaments intermingled therewith, with relatively little heat loss to the surroundings. This is particularly advantageous when the method is used to line thermally conductive pipes such as cast iron water mains.

As a further means of limiting heat loss from the liner to the duct and surroundings, the liner can be provided with an external layer of insulating plastics material, for instance a thermoplastics material such as is used in the composite.

The liner may similarly be provided with an internal layer of plastics material, such as polypropylene or polyethylene, which provides the liner with an internal surface meeting accepted standards for transmission of, for example, potable water supplies.

Duct lining methods in accordance with the present invention are not limited to lining in-situ, but could be applied to the lining of new pipes at the place of manufacture. Similarly, methods according to the present invention are not restricted to the provision of internal pipe linings, but may be adapted to provide external pipe covers.

In another of its aspects the invention provides a method of applying a lining or cover, respectively, to an interior or exterior surface of a duct comprising:

applying a liner/cover to the duct which comprises composite material comprising filaments of thermoplastic and filaments of reinforcing fibre;

heating the composite material to melt the thermoplastic filaments;

applying pressure to the liner/cover to press it into contact with the interior/exterior surface of the duct; and enabling or permitting the liner/cover to cool whilst in contact with the duct in order to harden the thermoplastic/reinforcing fibre composite.

Moreover, the present invention is not limited to the provision of pipe liners and the lining of pipes. In another of its aspects the invention provides a method of manufacturing a product, comprising knitting, braiding or weaving a composite material from intermingled filaments of thermoplastic and reinforcing fibre (e.g. TWINTEX).

The use in such a method of tows of intermingled filaments (e.g. TWINTEX) enables the production of products having a wide variety of configurations, tubular or otherwise. For instance, by knitting to an appropriate pattern a wide variety of pipe fittings and other products could readily be manufactured.

Existing industrial knitting machines can be adapted to knit such materials in accordance with the present invention. Varying knitted fabric diameters to suit existing underground pipes having a variety of stretch and recovery properties have been produced using a variety of tuck and other stitch structures. This coupled to circular machine cylinder diameter changes and alternative gauges, give the corresponding preformed wall thickness and stretch and strength characteristics required to contend with pipe applications used in the water industry.

In addition various positive feed methods incorporating 'positive feeds tapes' and "storage feeder" methods have been used to provide a 'snag' free continuous prefabricated tube of even quality.

Machine productivity has been improved by identifying a commercial match between gauge, diameter, speed, latch needle head and butt size, take down tension and positive yarn feed. Various yarn lubricants and methods have been incorporated improving yarn take off and runability. The yarn feeder position and design relative to positioning the yarn into the latch needle head has been investigated and set to aid runability of the "Twintex" yarn drawn from the package, both externally and internally.

Both electrical and mechanical patterning systems were used to identify the most simple yet versatile knitting structure design.

In addition, the use of infrared radiation to heat a thermoplastic/fibre reinforced composite material, and particularly use of infrared radiation of a wave length to which the fibre reinforcement is particularly sensitive, provides advantages in the moulding of products using conventional woven, or similar fibre reinforced thermoplastic composite materials. Thus, according to a further aspect of the present invention there is provided a method of manufacturing a product from a composite material comprising filaments of thermoplastic and filaments of reinforcing fibre, the method comprising;

irradiating the material with infrared radiation to melt the thermoplastic;

consolidating the thermoplastic and reinforcing fibres; and allowing the thermoplastic to harden with the material in a desired form.

Preferably the reinforcing fibres are glass fibres.

Specific embodiments of the present invention will now be described, by way of example only, with reference to the accompanying drawings, in which.

It will be appreciated from the above that all aspects of the present invention involve the use of material comprising filaments of a thermoplastic material and filaments of reinforcing fibres. In particular, the preferred material for use in the present invention is one knitted, braided or woven (or otherwise matted together) from tows comprising substantially continuous filaments of a thermoplastic and similarly continuous reinforcing fibres. More particularly, the preferred material is that available from Vetrotex International under the registered trade name TWINTEX.

Figure 1A:
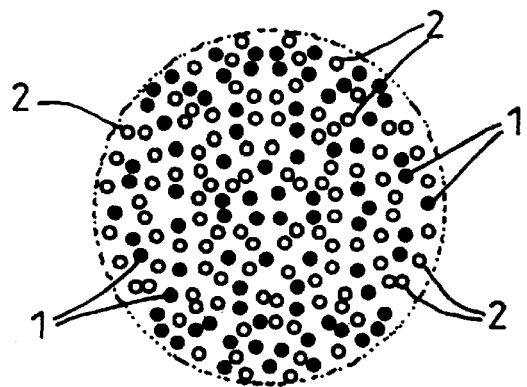
FIGS. 1a and 1b are schematic cross sections of two forms of thermoplastic/glass fibre composite tow suitable for use in the present invention.
Figure 1B:
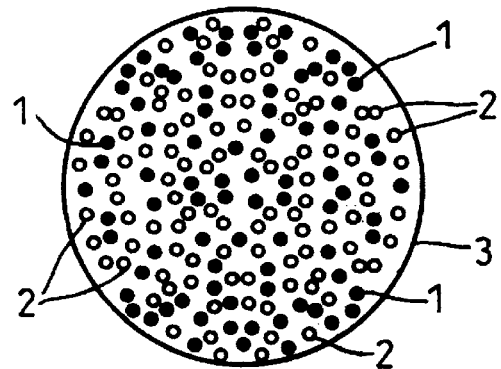

FIGS. 1a and 1b are cross-sections through two preferred forms of TWINTEX tows for use in the present invention. In both FIGS. 1a and 1b the thermoplastic filaments are shown as solid dots 1 whereas the glass reinforcing fibres are shown as circles. The two tows differ from one another in that with the tow of FIG. 1b the intermingled filaments are collectively sheathed by an enveloping layer 3 of thermoplastic (which will generally be the same thermoplastic as that used for the filaments 1).

Figure 2:
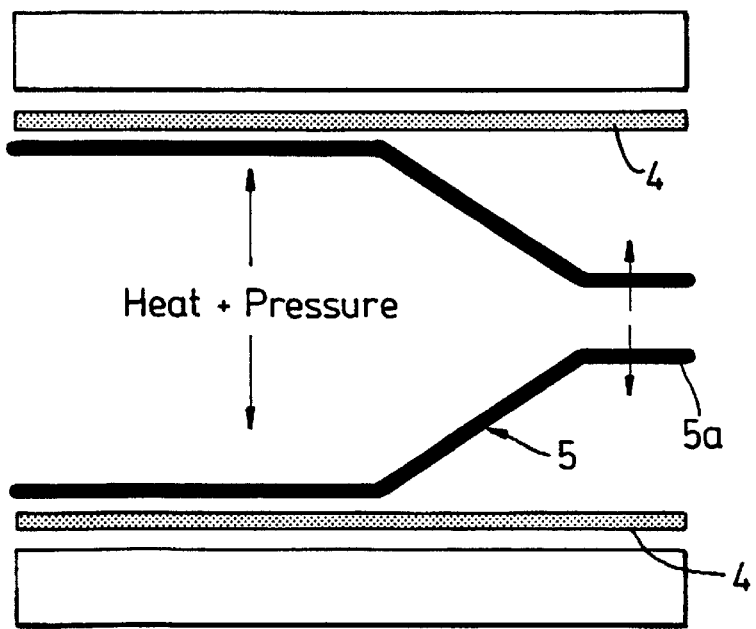
FIG. 2 is a schematic illustration of a pipe lining method in accordance with the present invention.

Referring now to FIG. 2, this is a general schematic of a pipe lining process in accordance with the present invention. An underground host pipe 4 is lined with a pipe liner 5 comprising a hose (i.e. a sleeve) knitted, braided or weaved from TWINTEX tows (generally the hose will be knitted from wound rovings of TWINTEX tows). The liner 5 is drawn into the pipe in a folded contracted configuration (a folded part of the liner being illustrated by reference 5a) using a winch (not shown). Once in position within the host pipe 4, the liner 5 is opened out and pressed into contact with the pipe wall. Heat and pressure is then applied to the liner to melt the thermoplastic filaments (for instance the liner would be heated to a temperature of about 148° C. where the thermoplastic is polyethylene) and to compress the liner 5 against the wall 4 of the pipe to consolidate the composite material. The liner 5 is then allowed to cool whilst in contact with the pipe wall, whereupon the thermoplastic hardens, forming a substantially rigid fibre reinforced composite lining.

Figure 3:
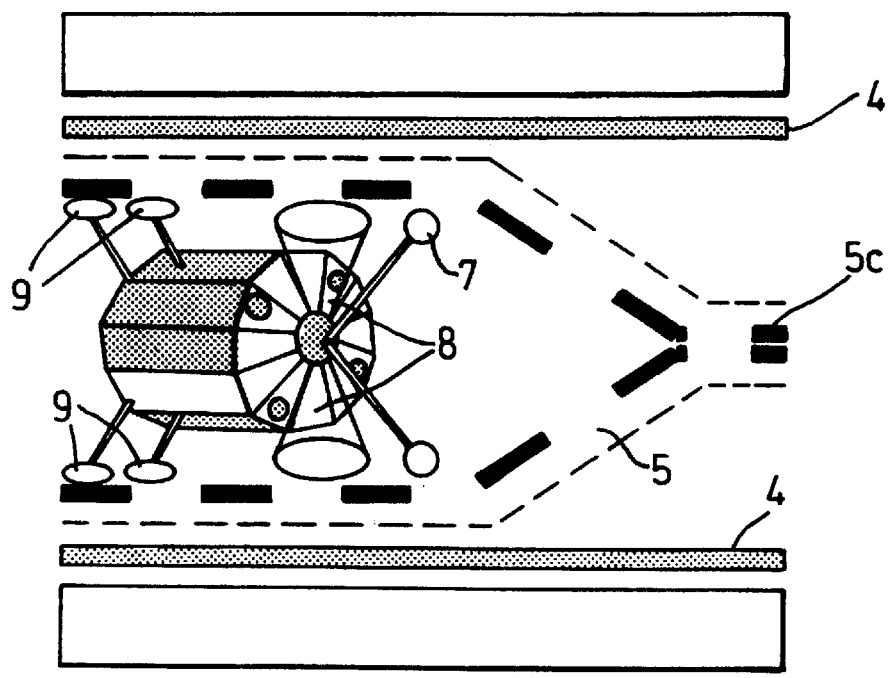
FIG. 3 is a schematic illustration of a pipe lining method in accordance with a first preferred embodiment of the present invention.

Referring now to FIG. 3, this illustrates use of a robotic pig 6 in the lining process described in relation to FIG. 2. The robotic pig 6 comprises positioning rollers 7 extending from its front end, heating means 8 located behind the positioning rollers 7, and cooling and consolidation rollers 9 extending from its rear end. In use, once the liner 5 has been inserted into the host pipe 4 in its folded configuration the pig 6 is passed along the pipe through the liner 5. As the pig 6 progresses through the liner 5 the positioning rollers 7 first open up the folded liner 5a ahead of the pig 6 and position the liner 5 against the wall of the pipe 4. Slight air pressure will inflate the Twintex preform against the surface of the pipe. Immediately behind the positioning rollers, the heating means (which may be for instance a radiative heater, or a hot gas heater) then heat up the liner 5 to a temperature sufficient to melt the thermoplastic. As the pig progresses further, the cooling and consolidation rollers 9 come into contact with the heated area of liner 5 and compress the liner 5 against the surface of the pipe 4 to both consolidate the composite material and to aid cooling of the material to speed up the hardening process. Thus, as the pig 6 travels along the pipe 4 it effectively converts the flexible hose into a fully formed and hardened composite lining.

As mentioned above, the heating means is preferably a shortwave infrared radiator. It has been found that the glass reinforcing fibres are particularly responsive to radiation so that most of the heat energy emitted by the heater is absorbed by the glass fibres and subsequently transmitted to the thermoplastic. This minimises heat loss to the surrounding pipe material and greatly reduces both the energy and time required for heating the lining to the required temperature.

Figure 4:
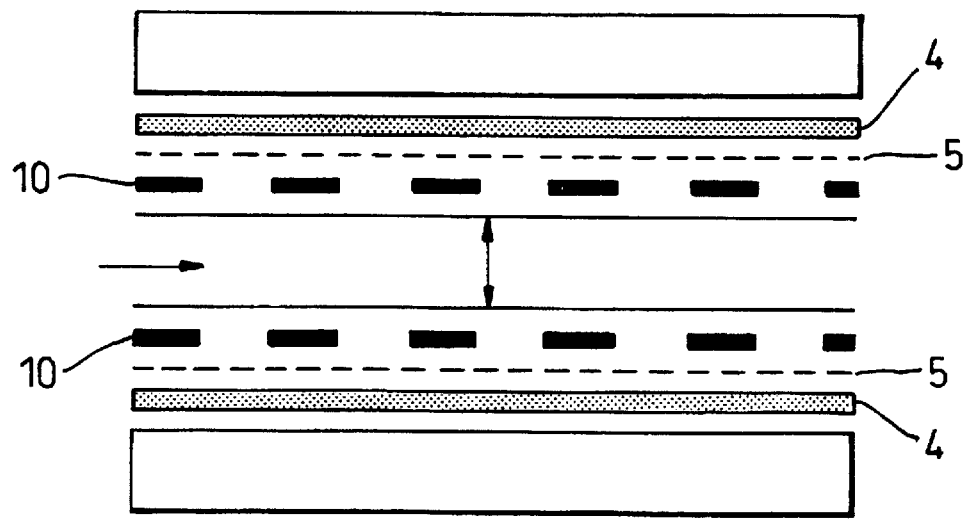
FIG. 4 is a schematic illustration of a pipe lining method in accordance with a second preferred embodiment of the present invention.

An alternative method of installing the liner 5, whilst still following the general scheme described in relation to FIG. 2, is illustrated by FIG. 4. Here, an inflatable bag 10 (e.g. a bag fabricated from silicone rubber) is inserted into the liner 5. The bag 10 is then inflated with hot gas, both to heat the liner 5 and to compress it against the wall of the pipe 4 to consolidate the thermoplastic and reinforcing fibres. The temperature and pressure within the bag can be controlled as desired. Subsequently, either the gas within the bag 10 can simply be allowed to cool to allow the thermoplastic to harden, or cold gas can be blown into the bag 10 to replace the hot gas and speed up the cooling process.

As a modification to the above method, the gas supplied to the bag 10 could be at ambient temperature and the bag could be heated by other means. For example, electrical heating elements or a system of heated pipes (e.g. carrying hot oil) could be distributed through the wall of the bag 10.

Figure 5:
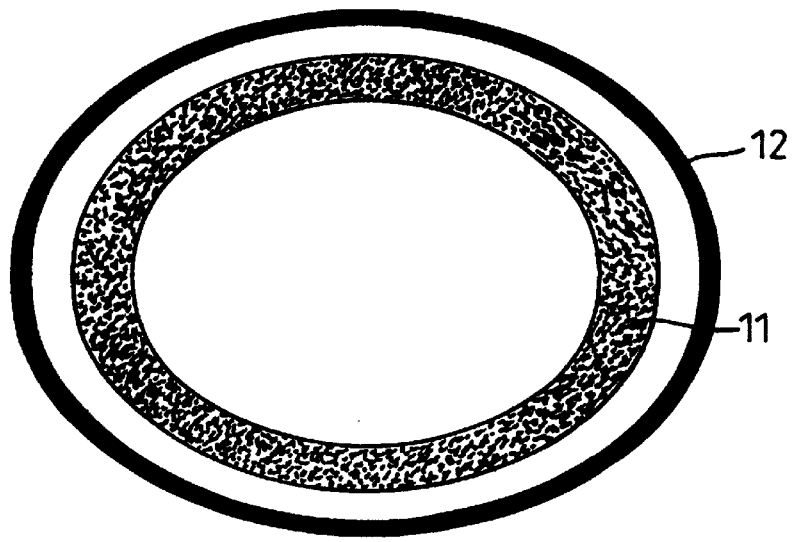
FIG. 5 is a schematic cross section through a pipe liner in accordance with the present invention.

As mentioned above, heat loss to the surrounding pipe and ground can be substantial, greatly increasing the energy and/or time required to heat the liner to the melting point of the thermoplastic. This problem can be particularly significant in the lining of cast iron water mains. Accordingly, the liner may be provided with a covering layer of an insulating plastics material, for instance a thermoplastic the same as that incorporated in the composite material used to fabricate the liner. A cross-section of such a liner is illustrated in FIG. 5. The liner comprises a composite tube 11 provided with an external sheath 12 of polypropylene or similar material.

Figure 6:
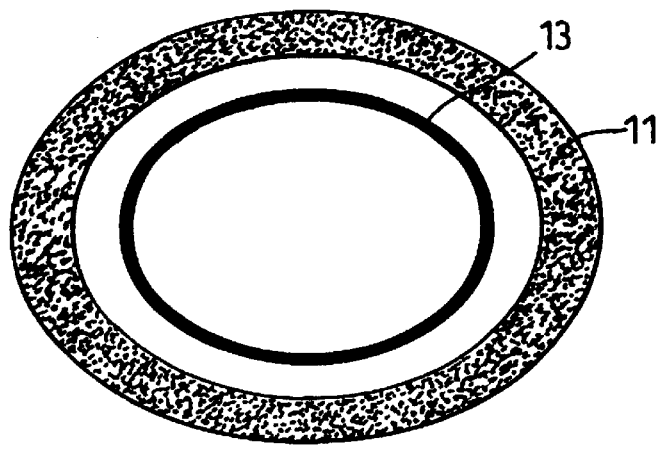
FIG. 6 is a schematic cross section through an alternative pipe liner in accordance with the present invention.

As a further modification, illustrated in FIG. 6, the inner surface of the liner 11 could also be provided with a layer of plastic material 13, such as polyethylene or polypropylene. This is particularly desirable when a liner is to be used for lining potable water mains. For instance, HDPE is a material widely used for conveying potable water and meets all required standards, which may not necessarily be met by the composite material used in fabricating the liner. Thus, incorporating a layer of HDPE (or similar material) at the inner surface of the liner provides a barrier between the composite material and the fluid to be conveyed through the liner.

It will be appreciated that the liner may be fabricated with both an external and an internal layer of thermoplastic material such as HDPE.

Because the liner is relative flexible when it is inserted into the host pipe, the insertion process is relatively straightforward. Furthermore, when the liner is expanded and pressed against the surface of the pipe, the flexibility of the liner can readily accommodate variations in the host pipe's diameter.

Knitting of the liner provides a convenient method of speedily manufacturing the liner into any desired shape, length, diameter and wall thickness. Moreover, as mentioned above, using new and existing knitting techniques the liner can be knitted into a variety of configurations. For instance, branches could be knitted into the liner so that a single piece liner can be used to line both a mains pipe and a lateral connection.

The liners according to the present invention also have the advantage that separate sections of liner can be readily connected together by simply heating and compressing together ends of respective liner sections together to form a weld. There is thus no need for the use of separate couplings.

Figure 7:
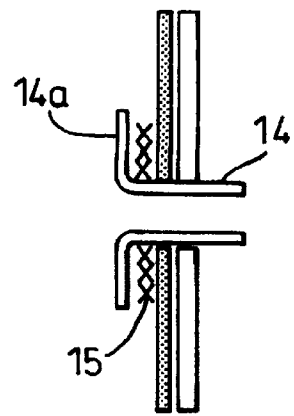
FIG. 7 is a schematic illustration of the manner in which a ferrule can be connected to a pipe lined in accordance with the present invention.

In addition, referring to FIG. 7, fitting ferrules to a pipe lined in accordance with the present invention is a relatively straightforward procedure. That is, an inner flange 14a of a ferrule 14 can be readily fixed and sealed to the pipe liner using a layer 15 of thermoplastic substance or similar.

It will be appreciated that the pipe lining methods discussed above represent only exemplary applications of the present invention. For instance, the above methods can readily be adapted to line or cover pipes at the point of manufacture. For example, modifications of the above methods can be used to provide an internal lining or external covering to a new ductile iron pipe.

Moreover, the invention is not limited to the provision of pipes and pipe liners, but the knitting process described herein can be used to produce products of a variety of forms, tubular and otherwise. For instance, a variety of pipe fittings and similar products could readily be prepared by knitting the composite material to an appropriate pre-form.

Furthermore, whilst many aspects of the present invention involve the use of a knitted material, using infrared radiation of a particular wavelength to which the reinforcing fibres are particularly responsive can advantageously be applied to the moulding of any thermoplastic/reinforced fibre composite product, whether or not the composite is knitted, woven or otherwise matted, and whether or not the composite comprises TWINTEX tows or otherwise. The wide applicability of this and other aspects of the present invention will be readily apparent to the appropriately skilled person.

As so far described, the liner introduced into the pipe is relatively flexible, even with thermoplastics coatings applied to the inner and/or outer surfaces of the composite material. Whilst this enables the liner to be collapsed readily, in some circumstances it may be acceptable, or even advantageous, for the liner to be stiff and relatively inflexible for introduction into a duct. This can be achieved by at least partially consolidating the composite material (by means of heat and pressure) to create a shaped, self-supporting, pre-form prior to insertion into a duct. The pre-form may be in the form of a collapsed tube, the tube being expanded under heat and pressure to line the pipe.

Alternatively, a sheet of the composite material may be heated and calendered (between opposing cooled rollers) to create consolidated sheet material. The stiff sheet material can then be rolled up into a substantially tubular form for insertion as a liner into a pipe, the roll of material being secured by, for example, steel wire. Upon releasing the wire fastenings, with the liner inside the pipe, the roll tends to uncoil to the inside diameter of the pipe. Overlapping edge margins of the pre-form can then be bonded together. Suitable joining means for achieving this can include electrical resistance wires which have been incorporated into the sheet of composite material at its margins, or a hot melt adhesive tape. The tape may be heated, by means, for example, of included resistance wires or a metal filler which can be heated by induction. A robotic pig may be used to seam weld the joint using, for example, a hot roller, ultrasonics or infra-red, followed by a cold roller.

What is claimed is:

1. A method of lining a duct comprising:

inserting into the duct a liner comprising a layer of composite material comprising filaments of thermoplastic and filaments of reinforcing fibre and an outer layer of thermoplastic material;

heating the liner to melt the thermoplastic filaments;

applying pressure to the heated liner to press the outer layer into contact with the duct and the layer of composite material into contact with the outer layer; and enabling or permitting the liner to cool whilst in contact with the duct in order to harden the thermoplastic/reinforcing fibre composite.

2. A method according to claim 1, wherein the liner is inserted into the duct in a collapsed configuration and is subsequently expanded into contact with the duct.

3. A method according to claim 1, wherein pressure is applied to consolidate the composite material as the liner is heated.

4. A method according to claim 1, wherein pressure is applied to consolidate the composite material as the liner is cooling.

5. A method according to claim 1, wherein the liner is heated by irradiating it with infrared radiation.

6. A method according to claim 1, wherein the liner is heated by means of hot gas.

7. A method according to claim 1, wherein the liner is heated by means of steam.

8. A method according to claim 1, wherein subsequent to insertion of the liner into the duct there is passed through the liner apparatus comprising at its front end means for pressing the liner into contact with the duct, heating means positioned to the rear of the pressing means for heating the liner, and consolidating means positioned to the rear of the heating means for applying pressure to the heated liner to consolidate the composite material.

9. A method according to claim 8, wherein the apparatus further includes cooling means located to the rear of the consolidating means for cooling the consolidated liner.

10. A method according to claim 1, wherein subsequent to insertion of the liner into the duct pressurised gas is introduced into the liner to press the liner against the duct, and the gas is heated to heat the liner.

11. A method according to claim 10, wherein an inflatable bag is inserted into the liner to receive the pressurised gas, the wall of the bag bearing against the liner to press it against the duct.

12. A method of lining a duct comprising:

inserting into the duct a liner comprising a layer of composite material comprising filaments of thermoplastic and filaments of reinforcing fibre;

introducing pressurised gas into the liner and heating the gas to melt the thermoplastic filaments with the pressurised gas pressing the liner into contact with the duct; and enabling or permitting the liner to cool whilst in contact with the duct in order to harden the thermoplastic/reinforcing fibre composite, and applying pressure to consolidate the composite material as the liner is cooling.

13. A method according to claim 12, wherein the liner is inserted into the duct in a collapsed configuration and is subsequently expanded into contact with the duct.

14. A method according to claim 12, wherein the pressurised gas consolidates the composite material as the liner is heated.

15. A method according to claim 12, wherein the liner also includes an outer layer of thermoplastics material.

16. A method according to claim 1 wherein the composite material is provided in the form of a sleeve.

17. A method according to claim 1 wherein the composite material of the liner introduced into the duct is provided as calendered sheet which has been rolled up into a tubular form.

18. A method according to claim 17, including the step of bonding together overlapping margins of the sheet material to form a tube.

19. A method according to claim 1, wherein the reinforcing fibre comprises reinforcing fibres of glass.

20. A method according to claim 16 wherein the composite material is knitted, braided or woven from tows comprising homogeneously intermingled filaments of thermoplastic and reinforcing fibre.

21. A method according to claim 20, wherein the tows have from about 40% to about 75% reinforcing fibre by weight.

22. A method according to claim 20, wherein the tows have between about 20% and about 50% of reinforcing fibre by volume.

23. A method according to claim 20, wherein each tow is enveloped in a thermoplastic sheath.

24. A method according to claim 20, wherein filaments of thermoplastic and reinforcing fibres are substantially continuous along the length of each tow.

25. A method according to claim 1, wherein the thermoplastic filaments comprises filaments of a polyolefin or thermoplastic polyester.

26. A method according to claim 1, wherein the liner also includes an internal layer of a thermoplastics material.

27. A method according to claim 12, wherein an inflatable bag is inserted into the liner to receive the pressurised gas, the wall of the bag bearing against the liner to press it against the duct.

28. A method according to claim 27, wherein the inflatable bag applies pressure to consolidate the composite material as the liner is cooling.

* * * * *